United States Patent
Iwai et al.

(10) Patent No.: US 7,878,578 B2
(45) Date of Patent: Feb. 1, 2011

(54) VEHICLE BODY FRONT PART STRUCTURE

(75) Inventors: Nobuhiro Iwai, Atsugi (JP); Yusuke Inomata, Ebina (JP); Yoshisada Kitagawa, Isehara (JP); Keigo Kiryuu, Chigasaki (JP); Echiko Murakami, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 140 days.

(21) Appl. No.: 12/207,993

(22) Filed: Sep. 10, 2008

(65) Prior Publication Data

US 2009/0102239 A1    Apr. 23, 2009

(30) Foreign Application Priority Data

Oct. 18, 2007    (JP)    ............... 2007-271448

(51) Int. Cl.
*B60R 21/34* (2006.01)
(52) U.S. Cl. ............... 296/193.11; 180/69.2; 180/69.23
(58) Field of Classification Search ............ 296/193.11, 296/193.1, 1.03; 180/69.2, 69.22, 69.23
See application file for complete search history.

(56) References Cited

U.S. PATENT DOCUMENTS

| | | | |
|---|---|---|---|
| 4,653,968 A * | 3/1987 | Rapata et al. ............... | 411/247 |
| 5,682,667 A * | 11/1997 | Flagg ......................... | 29/460 |
| 5,706,908 A | 1/1998 | Sakai et al. | |
| 6,039,388 A * | 3/2000 | Choi ........................... | 296/207 |
| 6,318,795 B1 * | 11/2001 | Pyo ............................ | 296/207 |
| 7,618,088 B2 * | 11/2009 | Bauer ......................... | 296/207 |
| 7,690,722 B2 * | 4/2010 | Boggess ..................... | 296/207 |
| 2006/0237998 A1 * | 10/2006 | Andre et al. ............ | 296/193.11 |
| 2009/0195028 A1 * | 8/2009 | Glickman et al. ........ | 296/193.1 |

FOREIGN PATENT DOCUMENTS

| | | |
|---|---|---|
| EP | 1 642 786 A2 | 4/2006 |
| JP | 59-006158 A | 1/1984 |
| JP | 64-16982 U | 1/1989 |
| JP | 4-23584 U | 2/1992 |
| JP | 2006-520717 A | 9/2006 |
| WO | WO 2004/083009 A1 | 9/2004 |

* cited by examiner

*Primary Examiner*—Patricia L Engle
(74) *Attorney, Agent, or Firm*—Foley & Lardner LLP

(57) ABSTRACT

A vehicle body front part structure includes a hood having a hood outer panel and a hood inner panel, and an impact absorber. The hood is openably and closably provided on an upper portion of a vehicle body constituent member. The impact absorber is interposed between the hood and the vehicle body constituent member and abuts against the vehicle body constituent member when the hood is closed. The impact absorber is mounted on the hood inner panel such that an end of the impact absorber projects toward the hood outer panel. The impact absorber includes upper and lower elastic portions. An impact inputted from the hood outer panel is absorbed such that the hood outer panel secondarily collides against the upper elastic portion. An impact caused when the hood is closed is absorbed such that the lower elastic portion abuts against the vehicle body constituent member.

10 Claims, 5 Drawing Sheets

VEHICLE BODY FRONT PART STRUCTURE

CROSS REFERENCE TO RELATED APPLICATIONS

This application is based upon and claims the benefit of priority from prior Japanese Patent Application P2007-271448 filed on Oct. 18, 2007; the entire contents of which are incorporated by reference herein.

BACKGROUND OF THE INVENTION

The present invention relates to a vehicle body front part structure in which an impact absorber is provided on a hood which is formed into a double panel structure comprising a hood outer panel and a hood inner panel.

Conventionally, as a vehicle body front part structure, there is a known vehicle body front part structure that an impact absorber is provided between a hood and a vehicle body constituent member to absorb impact which is input to the hood, as disclosed in Japanese Patent Application Laid-open No. 2006-520717.

According to the impact absorber of Japanese Patent Application Laid-open No. 2006-520717, a compression spring (elastic compression member) is compressed in an expansible case, and an elastic rubber (impact absorber) is mounted on a tip end of the case.

A base end of the case is mounted on the vehicle body constituent member such that the elastic rubber on the tip end opposes to the hood. And the elastic rubber is deformed and the compression spring is compressed, so that excessive impact which is input to the hood can be absorbed.

SUMMARY OF THE INVENTION

However, when such a conventional technique is applied to the hood of the double panel structure including the hood outer panel and the hood inner panel, the impact absorber absorbs only the impact applied to the hood inner panel with which the impact absorber comes into direct contact.

That is, since this conventional technique does not have a function for absorbing the impact energy in a space between the hood outer panel and the hood inner panel, the initial impact force which is input to the hood outer panel can not be absorbed efficiently and the absorbing efficiency of the entire impact energy is deteriorated.

Therefore, an object of the present invention is to provide a vehicle body front part structure capable of enhancing the absorbing efficiency of impact energy when a hood is of a double panel structure including a hood outer panel and a hood inner panel.

The present invention provides a vehicle body front part structure in which a hood including a hood outer panel and a hood inner panel positioned on a side of a back surface of the hood outer panel at a distance from the hood outer panel is provided on an upper portion of a vehicle body constituent member such that the hood can open and close, and an impact absorber is interposed between the hood and the vehicle body constituent member such that the impact absorber abuts against the vehicle body constituent member when the hood is closed, and the invention is most characterized such that the impact absorber is mounted on the hood inner panel such that an end of the impact absorber projects toward the hood outer panel, and an impact which is input to the hood outer panel is absorbed by the impact absorber, and an impact generated when the hood is closed is absorbed by the impact absorber.

DETAILED DESCRIPTION OF THE PREFERRED EMBODIMENTS

Figure 1:
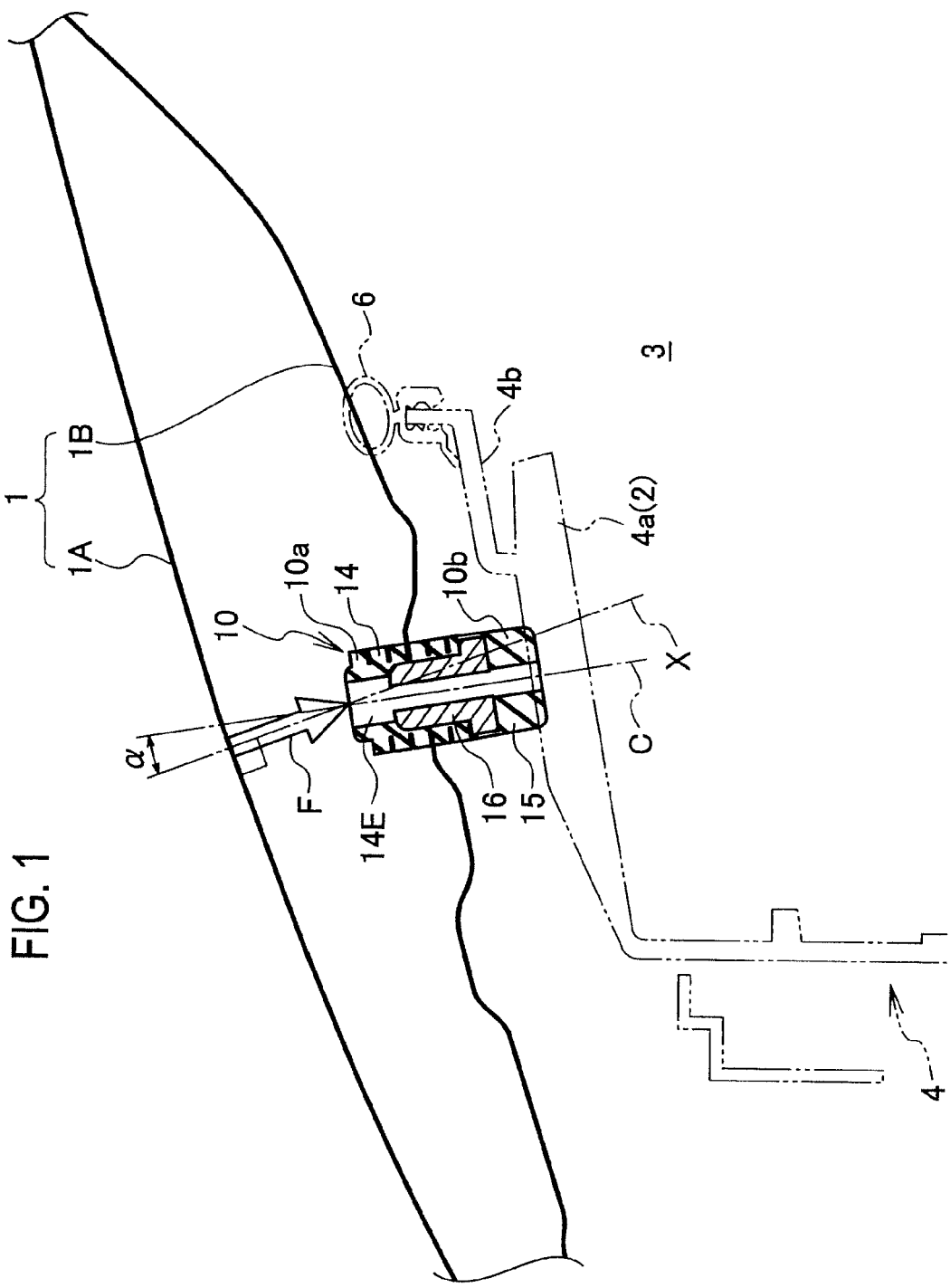
FIG. 1 is a sectional view of relevant parts showing a mounting state of an impact absorber according to an embodiment of the present invention.

An embodiment of the present invention will be explained below with reference to the accompanying drawings.

An engine room 3 having an opening at upper part of it is formed at a front part of vehicle. And a hood 1 which can open and close this opening is provided at a front part of vehicle.

A side end of a rear portion of the hood 1 is mounted on a vehicle body through a hinge (not shown). By rotating the hood 1 around a rotation shaft of the hinge extending in a width direction of the vehicle, a closed state of the hood 1 and an opened state of the hood 1 can be switched. In a vehicle having an engine provided on the side of a rear portion of the vehicle not on the side of a front portion of the vehicle, the hood 1 covers an upper side of a front compartment instead of the engine room 3.

The opening edge of the engine room 3 is provided in an upper portion of a radiator core support 4, and the opening edge is formed of a vehicle body constituent member 2 such as an upper rail 4a extending laterally at a front end in the longitudinal direction of the vehicle.

The hood 1 is provided on the upper portion of the vehicle body constituent member 2 such as the upper rail 4a such that the hood 1 can open and close.

The hood 1 includes a hood outer panel 1A and a hood inner panel 1B which is positioned at a distance from a back surface of the hood outer panel 1A.

Further, a bumper rubber (impact absorber) 10 is interposed between the upper rail 4a of the radiator core support 4 and the hood outer panel 1A for absorbing an impact generated when the hood 1 is closed.

In the present embodiment, the bumper rubber 10 is positioned at a central portion of the hood 1 and the upper rail 4a in the width direction of the vehicle, and an end 10a of the bumper rubber 10 is mounted on the hood inner panel 1B such that the end 10a projects toward the hood outer panel 1A.

Figure 2:
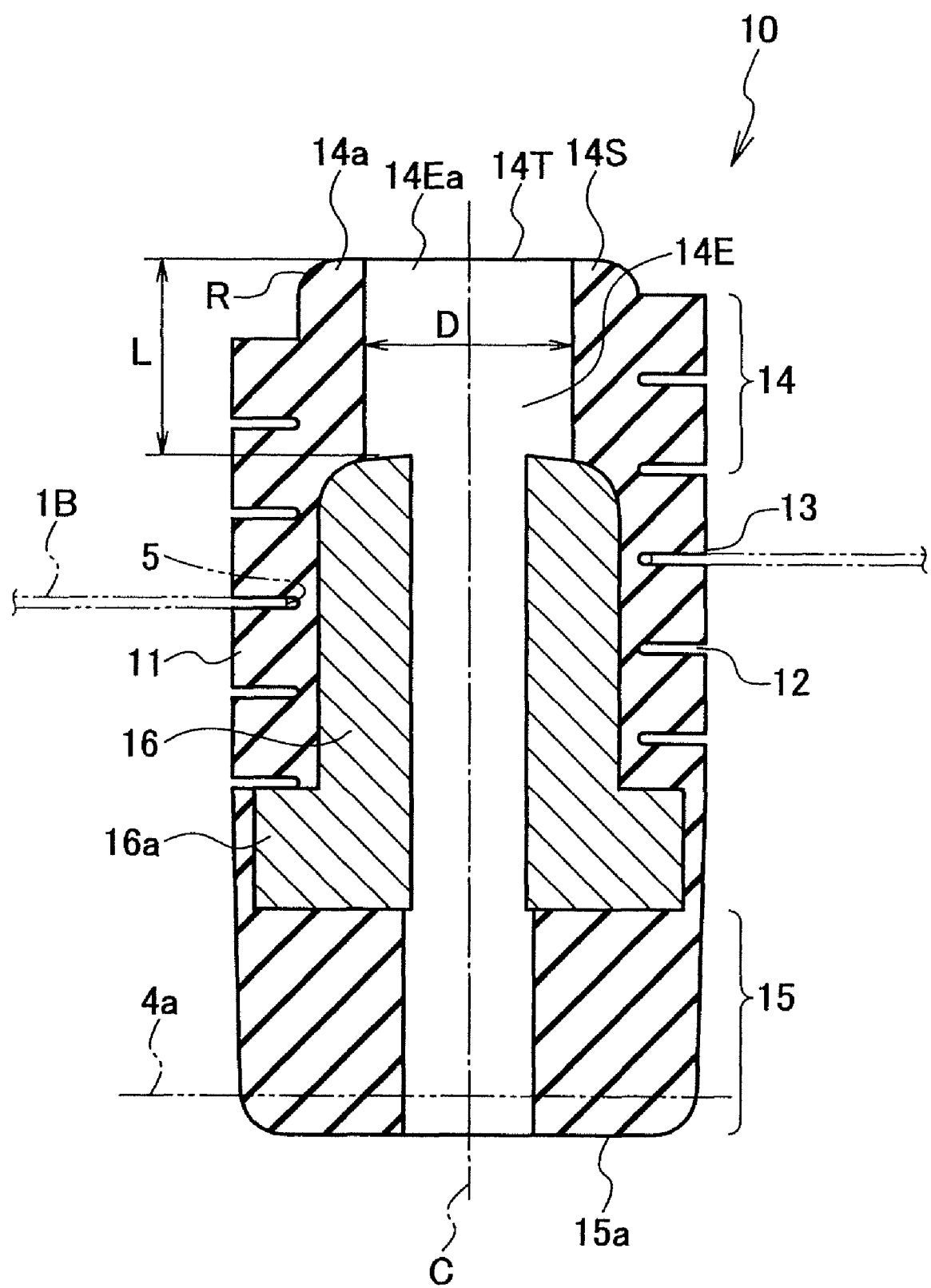
FIG. 2 is an enlarged sectional view of the impact absorber according to the embodiment.

Specifically, as shown in FIG. 2, the bumper rubber 10 is formed into a columnar shape such that an elastic body 11 such as rubber and soft synthetic resin is formed as a main body. A spiral groove 12 is formed in an outer periphery of the bumper rubber 10, and the spiral groove 12 is threadedly engaged with and screwed into an opening 5 formed in the hood inner panel 1B, thereby fixing the bumper rubber 10 to the opening 5 of the hood inner panel 1B. In the present embodiment, a central portion of the bumper rubber 10 in the axial direction (vertical direction in FIG. 2) is a mounting portion 13 with respect to the hood inner panel 1B.

By mounting the bumper rubber 10 on the hood inner panel 1B such that the end 10a of the bumper rubber 10 projects toward the hood outer panel 1A in this manner, an impact which is input to the hood outer panel 1A is absorbed by the bumper rubber 10, and an impact generated when the hood 1 is closed is absorbed.

In the present embodiment, the end 10a of the bumper rubber 10 is provided with an upper elastic portion (impact energy absorbing unit) 14 which absorbs an impact input from the hood outer panel 1A.

Further, in the present embodiment, a lower elastic portion 15 as an impact energy absorbing unit that absorbs an impact input from the hood inner panel 1B is provided on a part of the bumper rubber 10 closer to the upper rail 4a than the mounting portion 13, i.e., on an end 10b of the bumper rubber 10 opposite from the end 10a (lower side in FIG. 2).

The bumper rubber 10 is mounted such that a projecting tip end 15a of the lower elastic portion 15 abuts against the upper rail 4a when the hood 1 is closed.

The upper elastic portion 14 and the lower elastic portion 15 are made of material suitable for absorbing impact energy, such as elastic body, viscous plastic body, elastic plastic body made of rubber or soft synthetic resin or material having the same function.

When the hood 1 is closed, as shown in FIG. 1, a weather strip 6 mounted on a tip end of a bracket 4b extending rearward of the vehicle from the upper rail 4a comes into contact with the hood inner panel 1B under pressure so that liquid-tightness and sound insulation can be ensured.

In the present embodiment, the upper elastic portion 14 has a hollow portion 14E which can be crushed and deformed by an impact force input from the hood outer panel 1A. And an opening portion 14T is formed in the hollow portion 14E on a side opposed to the hood outer panel 1A. The upper elastic portion 14 is formed into a columnar shape in which its center axis C is oriented in the vertical direction of the vehicle body, the hollow portion 14E is formed into a columnar shape, and the upper elastic portion 14 and the hollow portion 14E are coaxially positioned.

A core portion (load-receiving portion) 16 is provided in a load transmitting path extending from the upper elastic portion 14 of the bumper rubber 10 to the hood inner panel 1B.

In the present embodiment, the core portion 16 is formed into a thick cylindrical shape, a lower end of the core portion 16 which comes into contact with the lower elastic portion 15 is provided with a large-diameter portion 16a. The core portion 16 is coaxially embedded into the bumper rubber 10 and is vulcanized and adhered.

Here, a width of the hollow portion 14E in a direction intersecting with an impact input direction (vertical direction) at right angles, i.e., an inner diameter of the hollow portion 14E is defined as D. And a distance between the impact force input end 14a of the upper elastic portion 14 and the core portion 16 is defined as L. In this condition, the hollow portion 14E is formed such that the inner diameter D becomes greater than the distance L between the impact force input end 14a and the core portion 16.

A projected absorbing unit 14S projects from an end of the upper elastic portion 14 on the side of the hood outer panel 1A toward the hood outer panel 1A. An outer diameter of the projected absorbing unit 14S is smaller than other portions of the upper elastic portion 14. The projected absorbing unit 14S is formed with a columnar space 14Ea which is in communication with the hollow portion 14E formed in the upper elastic portion 14. In the present embodiment, as shown in FIG. 2, not only the columnar space 14Ea and the hollow portion 14E, but also the hollow portion 14E and a hollow portion in the core portion 16, and the hollow portion of the core portion 16 and a hollow portion of the lower elastic portion 15 are also in communication with each other.

A curved portion R is formed on an outer peripheral end of the tip end of the projected absorbing unit 14S. The curved portion R has a rounded corner.

In the present embodiment, the spiral groove 12 formed in the outer side of the upper elastic portion 14 near the core portion 16 is used as a stress concentrating unit that is inclined with respect to the input direction of an impact force.

As shown in FIG. 1, the bumper rubber 10 is mounted on the hood inner panel 1B such that the center axis C of the upper elastic portion 14 and the deformation direction X of the hood outer panel 1A are deviated from each other by a predetermined angle α.

According to this structure, when some article collides against the hood 1, if an impact force F more than a predetermined value is input to the bumper rubber 10 from the hood 1, the following operation is carried out.

First, the hood outer panel 1A is plastically deformed downward in a convex form. If the hood outer panel 1A is deformed by the impact force F to some extent, the deformed hood outer panel 1A secondary collides against the upper elastic portion 14 of the bumper rubber 10. As a result, the upper elastic portion 14 is deformed by the hood outer panel 1A, and the impact force F which is input from the hood outer panel 1A is absorbed. The lower elastic portion 15 which abuts against the upper rail 4a is deformed by a load which is not absorbed by the upper elastic portion 14 and which is transmitted to the lower elastic portion 15, and this load is absorbed. The upper elastic portion 14 and the lower elastic portion 15 absorb the impact energy in this manner, and the entire absorbing efficiency of impact energy is enhanced.

According to the present embodiment, since the end 10a of the bumper rubber 10 is provided with the upper elastic portion 14, the upper elastic portion 14 can be deformed by the hood outer panel 1A which secondary collides against the upper elastic portion 14 when the impact force F is input to the hood outer panel 1A, and the impact force F which is input from the hood outer panel 1A can be absorbed.

That is, since the end 10a of the bumper rubber 10 is provided with the upper elastic portion 14, impact energy can be absorbed between the hood outer panel 1A and the hood inner panel 1B.

As a result, if the rigidity of the upper elastic portion 14 is appropriately set, a reaction force between the hood outer panel 1A and the hood inner panel 1B can be adjusted.

Further, according to the present embodiment, since the end 10b of the bumper rubber 10 is provided with the lower elastic portion 15, the lower elastic portion 15 can be deformed by a load transmitted to the lower elastic portion 15 from the hood inner panel 1B and an impact energy can be absorbed.

The effect obtained when the bumper rubber 10 is provided with the upper elastic portion 14 and the lower elastic portion 15 will be explained based on FIG. 3.

Figure 3:
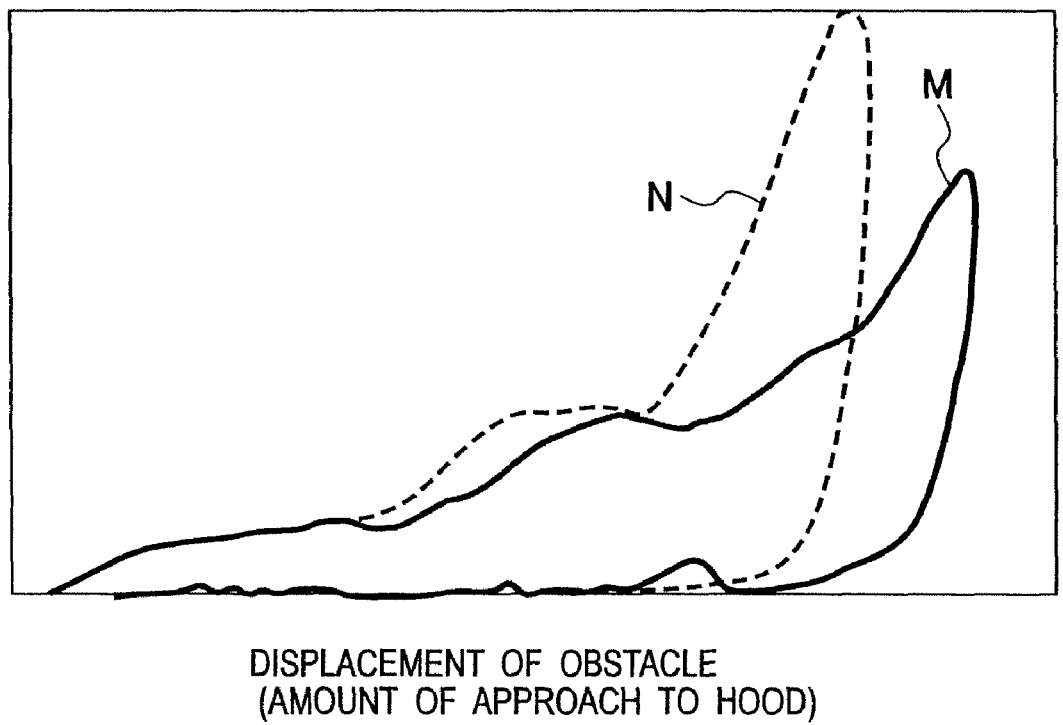
FIG. 3 is a graph for explaining an effect of the impact absorber according to the embodiment.

FIG. 3 is a graph for explaining a comparison of deceleration of an obstruction and history of displacement when the bumper rubber 10 of the embodiment is provided and when a bumper rubber having one elastic portion is provided. In FIG. 3, an experiment history M of the bumper rubber 10 of the embodiment, i.e., the bumper rubber 10 provided with the upper elastic portion 14 and the lower elastic portion 15 is shown with a solid line, and an experiment history N of a bumper rubber (comparative example 1) having only the lower elastic portion is shown with a broken line. As apparent from FIG. 3, as compared with the comparative example 1, it is understood that the bumper rubber 10 of the embodiment having the upper elastic portion 14 has reduced deceleration of the obstruction.

That is, the bumper rubber 10 of the embodiment absorbs the initial impact force F applied to the hood outer panel 1A more effectively than the comparative example 1, and can enhance the absorbing efficiency of the entire impact energy.

When the bumper rubber 10 is provided with the upper elastic portion 14 and the lower elastic portion 15, an impact of an obstruction which collides against the hood outer panel 1A can effectively be moderated.

Further, according to the present embodiment, since the upper elastic portion 14 is provided with the hollow portion 14E which is crushed and deformed by an impact force input from the hood outer panel 1A, a portion of the hollow portion 14E which is not crushed at the time of deformation can be reduced. As a result, since the deformation stroke of the hood outer panel 1A is increased, the absorbing efficiency of the impact energy can be enhanced correspondingly.

When the upper elastic portion 14 and the lower elastic portion 15 are integrally formed together using the same material, it becomes easy to adjust the rigidity by changing the diameter of the hollow portion 14E.

Figure 4:
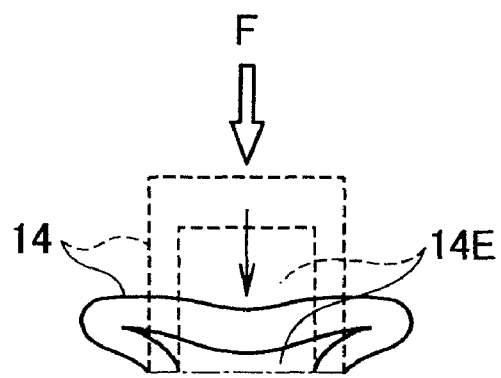
FIG. 4 is an explanatory diagram of a function of a hollow portion provided in an impact energy absorbing unit according to the embodiment.
Figure 5:
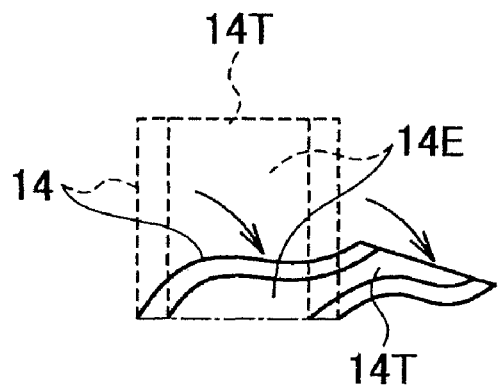
FIG. 5 is an explanatory diagram of a function of an opening portion provided in the hollow portion of the impact energy absorbing unit according to the embodiment.

Furthermore, according to the present embodiment, the opening portion 14T is formed in the hollow portion 14E on the side opposed to the hood outer panel 1A. With this configuration, as shown in FIG. 5, the deformation is not hindered by a lid and thus, the upper elastic portion 14 can be inclined laterally. Thus, as compared with a case having a lid as shown in FIG. 4, a portion which is not crushed at the time of deformation can be reduced.

Further, according to the present embodiment, the upper elastic portion 14 is formed into the columnar shape in which its center axis C is positioned in the vertical direction of the vehicle body, the hollow portion 14E is formed into the columnar shape and is coaxially positioned with the impact energy absorbing unit 14 and thus, the thickness of the upper elastic portion 14 in its circumferential direction can be made substantially equal over the entire periphery. As a result, no matter from which direction the impact force F is input, the bumper rubber 10 can be deformed stably. Particularly as in the present embodiment, when the bumper rubber 10 is provided at its outer periphery with the spiral groove 12 and it is screwed into the opening 5 of the hood inner panel 1B, equal effect can be exhibited without depending upon the rotation angle at the time of mounting operation and thus, it is unnecessary to enhance the machining precision of the bumper rubber 10 and the productivity can be enhanced.

The core portion 16 is provided in the load transmitting path extending from the upper elastic portion 14 of the bumper rubber 10 to the hood inner panel 1B. With this configuration, the impact force F is efficiently transmitted to the hood inner panel 1B through the core portion 16, and the function as the bumper rubber 10 can more reliably be exhibited. There is also a merit that the bumper rubber 10 can be arranged on the hood inner panel 1B stably and reliably.

Figure 6:
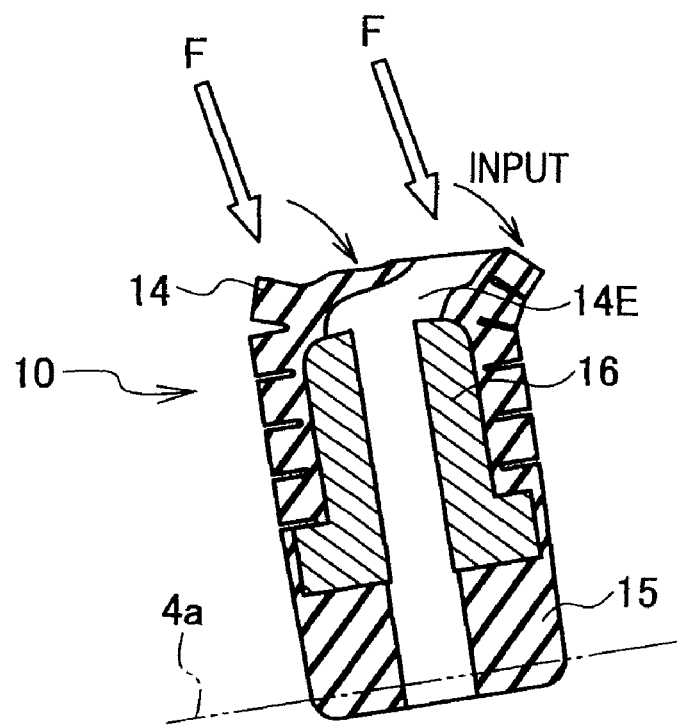
FIG. 6 is an explanatory diagram of a function created by a diameter of the hollow portion of the impact energy absorbing unit according to the embodiment.

The inner diameter D of the hollow portion 14E is made greater than the distance L between the core portion 16 and the impact force input end 14a of the upper elastic portion 14. With this configuration, as shown in FIG. 6, the cylindrical upper elastic portion 14 can be folded into the hollow portion 14E efficiently, and a portion which is not crushed at the time of deformation can further be reduced.

The projected absorbing unit 14S projected toward the hood outer panel 1A is provided on the end of the upper elastic portion 14 on the side of the hood outer panel 1A. With this configuration, it becomes easy to adjust the reaction force by the projected absorbing unit 14S. Since the outer diameter of the projected absorbing unit 14S is made smaller than the outer diameter of the other portion of the upper elastic portion 14, it becomes easy to insert the bumper rubber 10 into the opening 5 of the hood inner panel 1B, and it becomes easy to mount the bumper rubber 10 on the hood inner panel 1B by screwing.

The columnar space 14Ea which is in communication with the hollow portion 14E formed in the upper elastic portion 14 is formed in the projected absorbing unit 14S. With this configuration, a portion which is not crushed when the upper elastic portion 14 is deformed can be reduced, and the reaction force can easily be adjusted. Particularly, according to the present embodiment, since the lower elastic portion 15 is also formed with the hollow portion, the reaction force can easily be adjusted more, and the portion which is not crushed can be reduced more.

Figure 7:
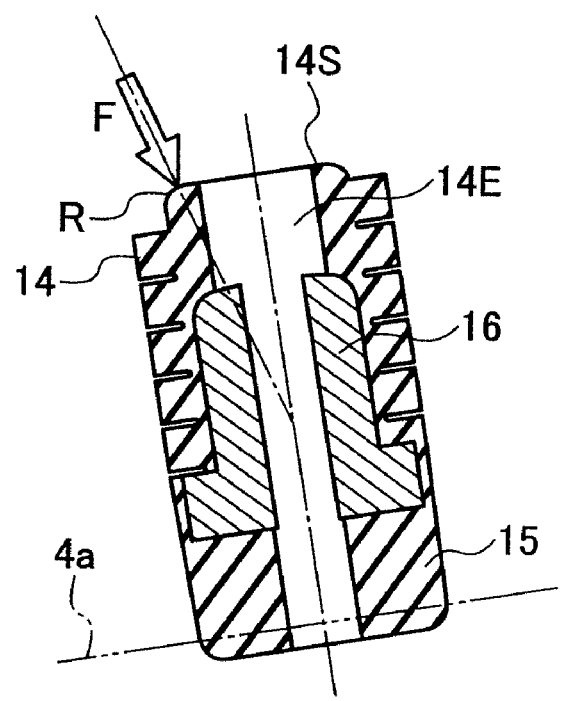
FIG. 7 is an explanatory diagram of a function when a curved portion having a rounded corner is formed on a projected absorbing unit provided in the impact energy absorbing unit according to the embodiment.

According to the present embodiment, since the curve surface R having the rounded corner is formed on the outer peripheral end of the tip end of the projected absorbing unit 14S, the hood outer panel 1A deformed by the impact force F is brought into contact with the projected absorbing unit 14S, and a force in the laterally bending direction can be generated in the projected absorbing unit 14S. Since the curved surface R is formed on the outer peripheral end of the tip end of the projected absorbing unit 14S, as shown in FIG. 7, even if the impact force F is input from various angles into the curved surface R, the laterally bending mode can be generated stable in the projected absorbing unit 14S, and it is possible to more reliably enhance the absorbing efficiency of impact energy.

According to the present embodiment, the spiral groove 12 formed in the outer side of the upper elastic portion 14 near the core portion 16 is used as the stress concentrating unit that is inclined with respect to the input direction of an impact force. With this configuration, a laterally bending mode can stably be generated in the upper elastic portion 14 when the impact force F is input.

Figure 8:
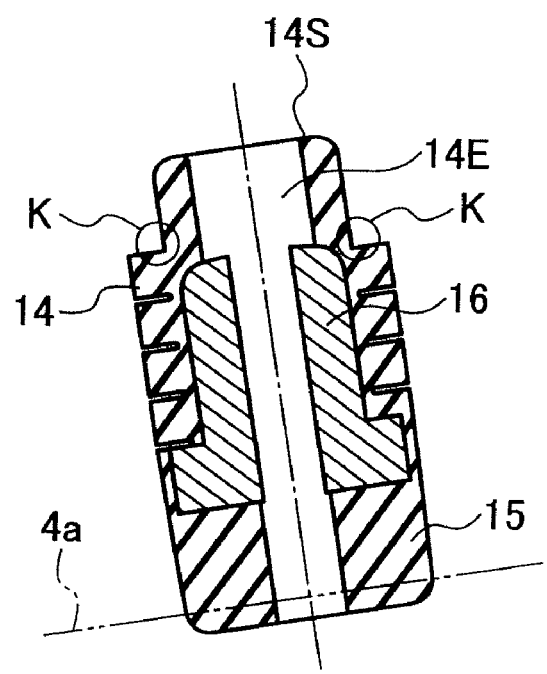
FIG. 8 is a sectional view of a bumper rubber showing a modification of a stress concentrating unit that is inclined with respect to an input direction of an impact force according to the embodiment.

The stress concentrating unit is not limited to the spiral groove 12 and as shown in FIG. 8, a step portion which is inclined with respect to the center axis C is provided, and a corner K of the step portion can be used as the stress concentrating unit.

According to the present embodiment, the bumper rubber 10 is mounted on the hood inner panel 1B such that the center axis C of the upper elastic portion 14 and the deformation direction X of the hood outer panel 1A are deviated from each other by the predetermined angle α. Thus, the lateral bending is easily generated in the upper elastic portion 14, and a portion which is not crushed when the upper elastic portion 14 is deformed can further be reduced. It is preferable that the bumper rubber 10 is mounted such that the inclination angle α becomes 6° or greater. With this configuration, a sine value with respect to the inclination angle α becomes 0.1 or greater (sin 6°≈0.1), and a force in the lateral bending direction becomes 10% or greater of the input impact force F, and the upper elastic portion 14 can effectively be bent.

As described above, according to the present invention, the impact absorber is mounted on the hood inner panel such that the end of the impact absorber projects toward the hood outer panel, and the impact energy absorbing unit is provided closer to the hood outer panel than the hood inner panel of the impact absorber. With this configuration, an impact force which is input from the hood outer panel is absorbed by the impact energy absorbing unit. Thus, a reaction force between the hood outer panel and the hood inner panel can be adjusted and the impact against an obstruction which collides against the hood outer panel can effectively be moderated. That is, the initial impact force applied to the hood outer panel can efficiently be absorbed and the absorbing effect of the entire impact energy can be enhanced.

While the embodiment of the present invention has been described above, the invention is not limited to the above embodiment and changes and modifications can be made within the scope of the gist of the present invention.

What is claimed is:

1. A vehicle body front part structure comprising:
   a hood including a hood outer panel and a hood inner panel arranged on a back surface side of the hood outer panel at a distance apart from the hood outer panel, the hood being openably and closably provided on an upper portion of a vehicle body constituent member; and
   an impact absorber interposed between the hood and the vehicle body constituent member and configured to abut against the vehicle body constituent member when the hood is closed,
   wherein the impact absorber is mounted on the hood inner panel such that an end of the impact absorber projects toward the hood outer panel,
   wherein the impact absorber includes:
      an upper elastic portion which projects toward the hood outer panel; and
      a lower elastic portion configured to abut against the vehicle body constituent member when the hood is closed,
   wherein the impact absorber is configured such that an impact inputted from the hood outer panel is absorbed in such a manner that the hood outer panel secondarily collides against the upper elastic portion,
   wherein the impact absorber is configured such that an impact caused when the hood is closed is absorbed in such a manner that the lower elastic portion abuts against the vehicle body constituent member, and
   wherein the upper elastic portion includes a hollow portion configured to be crushed and deformed when the hood outer panel secondarily collides against the upper elastic portion.

2. The vehicle body front part structure according to claim 1, wherein an opening portion is formed in the hollow portion on a side opposed to the hood outer panel.

3. The vehicle body front part structure according to claim 1, wherein the upper elastic portion is formed into a columnar shape in which a center axis is positioned in a vertical direction of a vehicle body, and wherein the hollow portion is formed in the columnar shape and is coaxially positioned with the upper elastic portion.

4. The vehicle body front part structure according to claim 1, wherein a load-receiving portion is provided in a load transmitting path extending from the upper elastic portion to the hood inner panel.

5. The vehicle body front part structure according to claim 4, wherein a width of the hollow portion in a direction perpendicular to an input direction of an impact force is greater than a distance between an impact force input end of the upper elastic portion and the load-receiving portion.

6. The vehicle body front part structure according to claim 1, wherein a projected absorbing portion that projects toward the hood outer panel is provided on an end of the upper elastic portion on a side of the hood outer panel,.

7. The vehicle body front part structure according to claim 6, wherein the projected absorbing portion includes a columnar space portion which is in communication with the hollow portion.

8. The vehicle body front part structure according to claim 6, wherein a curved portion having a rounded corner is formed on an outer peripheral end of the projected absorbing portion.

9. The vehicle body front part structure according to claim 4, wherein a stress concentration portion which is inclined with respect to an input direction of an impact force is provided on an outer side of the upper elastic portion near the load-receiving portion.

10. The vehicle body front part structure according to claim 3, wherein the impact absorber is mounted on the hood inner panel such that a direction of the center axis of the upper elastic portion and a deformation direction of the hood outer panel are different from each other.

* * * * *